United States Patent
Schmidt-Winkel et al.

(10) Patent No.: US 12,140,188 B2
(45) Date of Patent: Nov. 12, 2024

(54) METHOD FOR THE QUIET AND RELIABLE ACTUATION OF A CLAW CLUTCH, AND CLAW CLUTCH ARRANGEMENT

(71) Applicant: ZF FRIEDRICHSHAFEN AG, Friedrichshafen (DE)

(72) Inventors: Norman Schmidt-Winkel, Kürnach (DE); Fabian Hartmann, Hettstadt (DE); Ludwig Geißelbrecht, Schweinfurt (DE); Martin Ruider, Schwarzhofen (DE); Bastian Schuh, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/053,844

(22) Filed: Nov. 9, 2022

(65) Prior Publication Data

US 2023/0160437 A1 May 25, 2023

(30) Foreign Application Priority Data

Nov. 24, 2021 (DE) ...................... 10 2021 213 219.7

(51) Int. Cl.
*F16D 11/10* (2006.01)
*F16D 11/06* (2006.01)
*F16D 11/00* (2006.01)

(52) U.S. Cl.
CPC ........ *F16D 11/06* (2013.01); *F16D 2011/002* (2013.01); *F16D 2011/004* (2013.01)

(58) Field of Classification Search
CPC ......... F16D 2023/141; F16D 2011/002; F16D 11/06; F16D 11/10; F16D 2125/24; F16D 2125/42
See application file for complete search history.

(56) References Cited

U.S. PATENT DOCUMENTS 1,193,008 A * 8/1916 Fuller ..................... F16D 11/04
192/24
5,573,096 A * 11/1996 Erlebach ............... F16D 25/088
192/69.8

(Continued)

FOREIGN PATENT DOCUMENTS

DE 4113128 10/1992
DE 4443783 8/1995

(Continued)

OTHER PUBLICATIONS

Office Action for corresponding German Patent Application No. 10 2021 213 219.7.

*Primary Examiner* — Stacey A Fluhart
(74) *Attorney, Agent, or Firm* — Cozen O'Connor

(57) ABSTRACT

A claw clutch for positively connecting a first rotatable component to a second rotatable component. A claw clutch for motor vehicles having an electric drive train which permits a reliable connection of the claw clutch when tooth-on-tooth positions are released and, at the same time, reduces the number of moving elements on the sliding sleeve. A clutch body, which is arranged on the first rotatable component for conjoint rotation therewith, has a first tooth system and a sliding sleeve, which is arranged on the second rotatable component in a manner which allows conjoint rotation and axial movement, has a second tooth system and is axially movable via a shift fork by an actuator system in order to load a spring element by the actuator system in the case of a tooth-on-tooth position. The spring element to be loaded is arranged outside the second rotatable component equipped with the sliding sleeve.

25 Claims, 7 Drawing Sheets

(56) References Cited

U.S. PATENT DOCUMENTS

| | | | |
|---|---|---|---|
| 6,701,796 B2* | 3/2004 | Blanchard | F16H 55/22 56/11.8 |
| 9,109,634 B2* | 8/2015 | Tronnberg | F16D 28/00 |
| 2010/0089685 A1* | 4/2010 | Quehenberger | F16D 27/118 180/383 |
| 2016/0298509 A1* | 10/2016 | Krapf | F16D 27/108 |
| 2022/0154778 A1* | 5/2022 | Lee | F16D 23/12 |

FOREIGN PATENT DOCUMENTS

| | | | |
|---|---|---|---|
| DE | 102017113579 | 12/2017 | |
| DE | 102019127391 | 4/2020 | |
| DE | 102019203255 | 9/2020 | |
| DE | 102019217660 | 10/2020 | |
| DE | 102021103808 | 8/2021 | |
| JP | 2508153 B2 * | 6/1996 | G05D 3/12 |

* cited by examiner

METHOD FOR THE QUIET AND RELIABLE ACTUATION OF A CLAW CLUTCH, AND CLAW CLUTCH ARRANGEMENT

BACKGROUND OF INVENTION

1. Field of the Invention

The disclosure relates to a method for actuating a claw clutch for positively connecting a first rotatable component to a second rotatable component, and to a claw clutch arrangement, wherein a clutch body, which is arranged on the first rotatable component for conjoint rotation therewith, has a first tooth system, and a sliding sleeve, which is arranged on the second rotatable component in a manner which allows conjoint rotation and axial movement, has a second tooth system.

The field of application of the invention is preferably in the automotive industry, particularly in transmissions of motor vehicles with electric drive.

2. Description of Related Art

In hybrid and electric motor vehicles, there is a need to decouple an electrically driven axle or the electric motor, which is a selectable drive, from the rest of the drive train. This makes it possible, for example, to avoid a situation where the drag torque of the electric motor takes the form of a power loss. Claw clutches, i.e. clutches with positive-locking tooth systems, are usually used as the clutch. For engagement of the electric motor, it is therefore necessary to close a claw clutch when the vehicle is at a standstill or while driving, and, in this context, the engagement of the tooth systems of the two clutch elements should take place as quietly as possible and it is necessary to ensure that the engaged state of the claws is achieved before the drive torque of the electric motor is transmitted.

Particularly in the case of a stationary vehicle and thus a stationary output shaft, it may happen that the end faces of two teeth or claws of components to be brought into engagement of a claw clutch to be closed rest against one another with their respective raised parts, and thus the desired gear cannot be selected. This position is called a tooth-on-tooth position. In order to allow quiet engagement by an actuator system despite such a tooth-on-tooth position, there is a known practice of supporting the clutch body, which is in fact axially fixed in position, on one of the two rotatable components by a spring element, that is to say of decoupling it axially.

A solution of this kind is known from DE 10 2019 203 255 A1, in which a claw clutch for positively connecting two rotatable components has a sliding sleeve which is arranged on one component in a manner which allows conjoint rotation and axial movement, and a clutch body is arranged on the other component for conjoint rotation therewith. In this case, a rotatable shifting ring, which can be moved axially relative to the sliding sleeve is used to load a spring situated between the shifting ring and the sliding sleeve by the axial relative movement in the event of a tooth-on-tooth position, and, after the tooth-on-tooth position has been released (in the case of matching engagement), the axial relative movement is reversed as a result of the spring load, the spring-damped axial movement and a damping space which is thereby additionally formed leading to the retardation of the axial movement and thus to a reduced noise level.

In the overall movement sequence of the coupling process, the sliding sleeve can be engaged with a time delay despite an initial tooth-on-tooth position, while the actuator for the engagement of the sliding sleeve is moved forward continuously, thereby simplifying the control of the actuator.

In this case, axial decoupling of the movement sequences of the sliding sleeve and of the actuator system for the movement of the sliding sleeve is achieved by an additional spring-loaded shifting ring, which can be moved axially on the sliding sleeve and on which a shift fork of the actuator system acts. In this way, the shifting ring and/or the sliding sleeve can be moved for a specific predetermined travel without the other part having to move along with it. On the other hand, the shifting ring and the sliding sleeve are not completely decoupled since otherwise they could not be engaged together when there is no tooth-on-tooth position.

In order to detect the engagement of the tooth systems of the sliding sleeve and the fixed clutch body in the reliable engagement state when the movements of the sliding sleeve and the actuator system are axially decoupled, there is also usually a sensor in the drive train of the actuator system, which detects and controls the actuator travel, and a further sensor is provided on the same side as the clutch body in order to detect the position of the sliding sleeve or of the axially movable clutch body.

SUMMARY OF THE INVENTION

One aspect of the invention is a simplified possibility for operating a claw clutch for an electric drive train of a motor vehicle that permits reliable positive connection of the claw clutch by decoupling the actuator movement and the movement of the sliding sleeve during the release of tooth-on-tooth positions of the clutch body and sliding sleeve and, at the same time, reduces the number of movable elements on the movable component which carries the sliding sleeve. A further object is to ensure reliable detection of the shift positions without a further sensor on the same side as the clutch body.

One aspect of the invention is a method for actuating a claw clutch for positively connecting a first rotatable component to a second rotatable component, wherein a clutch body, which is arranged on the first rotatable component for conjoint rotation therewith, has a first tooth system, and a sliding sleeve, which is arranged on the second rotatable component in a manner which allows conjoint rotation and axial movement, has a second tooth system, by the following steps:

a) axial movement of the sliding sleeve of the second rotatable component for positive connection to the clutch body of the first rotatable component by a shift fork by means of an actuator system, b) loading a spring element outside the second rotatable component equipped with the sliding sleeve by means of the actuator system via the shift fork when a tooth-on-tooth position of the sliding sleeve relative to the clutch body of the first rotatable component occurs, c) loading the spring element up to a maximum loading travel of the spring element which is sufficient to allow reliable engagement of the second tooth system of the sliding sleeve into the first tooth system of the clutch body after the tooth-on-tooth position has been released, d) relaxation of the spring element to actuate the sliding sleeve when the tooth-on-tooth position has been released by relative rotation between the first and second movable components of the claw clutch.

Loading of a spring element outside the second rotatable component equipped with the sliding sleeve should preferably be understood as meaning that the spring element is not in the region of the rotatable component since it surrounds the latter radially, for example, and in particular is not situated between the sliding sleeve and the clutch body of the rotatable component.

The spring element is advantageously loaded rotationally on an actuator element which drives the shift fork. In this case, the spring element is preferably loaded rotationally between the drive and the drive shaft of the actuator system. However, it can also be loaded rotationally on a shift fork, which is operated in a pivoting manner as a shift rocker so as to operate the sliding sleeve.

Alternatively, the spring element is advantageously loaded linearly on an actuator element which drives the shift fork. In this case, the sliding sleeve can be moved axially by an actuator element with a laterally rigidly connected shift fork by parallel movement of the actuator element.

Another expedient configuration proves to be one in which the spring element is loaded axially against the first rotatable component on the clutch body opposite the sliding sleeve when a tooth-on-tooth position occurs during movement of the sliding sleeve.

In a further preferred aspect, the method is supplemented as follows:
  in step c), the spring element is loaded up to a maximum loading travel of the spring element, which is selected to be smaller than it would be in the case of a travel of the sliding sleeve against the clutch body when the tooth-on-tooth position is released by defined reliable engagement of the second tooth system of the sliding sleeve into the first tooth system of the clutch body, and
  in step e), the shift position for reliable engagement of the second tooth system of the sliding sleeve into the first tooth system of the clutch body is detected by measuring the position of a selected actuator element of the actuator system, which is situated in front of the spring element in the direction of the actuated sliding sleeve, wherein the position for reliable engagement of the tooth system is identified when a predetermined final end position of the selected actuator element can only be reached after the previous tooth-on-tooth position has been released and engagement by the maximum loading travel of the loaded spring element has been carried out.

In this case, the shift position of the claw clutch is preferably determined by angular measurement on the rotationally operated actuator element. For this purpose, the shift position can be determined by angular measurement on a driven arm of the pivotable shift fork, which is equipped with a spring rocker.

Alternatively, the shift position of the claw clutch can be determined by angular measurement on the drive of the actuator system. As a particular preference, the shift position is determined by an incremental rotary encoder.

Furthermore, the shift position of the claw clutch can advantageously be determined by length measurement on a linearly movable actuator element, which moves the sliding sleeve axially via the shift fork. In this case, the shift position of the claw clutch is expediently determined by length measurement on a linearly movable actuator element, which moves the sliding sleeve axially via the shift fork, wherein the shift position can preferably be determined with an incremental displacement sensor on the linearly operated actuator element.

Furthermore, the problem is solved, in the case of a claw clutch arrangement for positively connecting a first rotatable component to a second rotatable component, wherein a clutch body is arranged on the first rotatable component for conjoint rotation therewith and has a first tooth system, a sliding sleeve, which is arranged on the second rotatable component in a manner which allows conjoint rotation and axial movement, has a second tooth system, the sliding sleeve for positive connection to the clutch body of the first component is axially movable by a shift fork by an actuator system in order to load a spring element by the actuator system in the case of a tooth-on-tooth position, in that the spring element to be loaded is arranged outside the second rotatable component equipped with the sliding sleeve.

It is advantageous if the clutch body is axially movable on the first rotatable component and is equipped with the spring element.

However, the actuator system can also have the spring element on an actuator element mounted in front of the shift fork. In this case, the spring element can expediently be attached to a shift rocker as a leg spring at a pivot point of the shift fork.

In an alternative embodiment, the spring element can be arranged as a barrel spring between an annular flange and the shift fork, on a linear guide on which the shift fork projects laterally and is axially movable. In this case, there is preferably a rotational drive for moving the linear guide by means of a rack-and-pinion mechanism or a screw drive.

In a further preferred embodiment, the spring element can be attached as a torsion spring to a drive shaft of the actuator system and can be loaded over a defined loading travel by means of the rotational drive.

In all the above embodiments of the spring element, it may be advantageous if the spring element has a limited maximum loading travel, which is smaller than it would be in the case of a travel of the sliding sleeve against the clutch body when the tooth-on-tooth position is released by defined reliable engagement of the second tooth system of the sliding sleeve into the first tooth system of the clutch body.

For this purpose, the actuator system preferably has a sensor for detecting the shift position of the claw clutch, which is formed on a selected actuator element between the drive of the actuator system and the spring element in such a way that a further actuating movement of the selected actuator element can be detected by the sensor, which further actuating movement can only be carried out if, after the tooth-on-tooth position of the sliding sleeve and clutch body has been released, the limited maximum loading travel is reset by relaxation of the spring element and permits further engagement of the tooth systems of the sliding sleeve and the clutch body.

For this purpose, the sensor is preferably attached as a rotary encoder to an actuator element which is moved in rotation or to the drive of the actuator system, or else is arranged as a displacement transducer on a linearly moved actuator element of the actuator system. As a particular preference, the rotary encoder or the displacement transducer are designed as incremental encoders.

The core concept of one aspect of the invention is that, in the case of a claw clutch for quiet and reliable positive connection of the tooth systems, it is important that the axial engagement of the sliding sleeve is at least partially decoupled via a shift fork of a so-called actuator system, and the spring elements and auxiliary components which are required for this purpose are simplified and are not arranged on the sliding sleeve of the claw clutch. According to an aspect of the invention, therefore, the shift fork acts as a direct movement element on the sliding sleeve, and therefore the second rotatable component with the axially movable sliding sleeve is kept free of further movable components. For the additionally required decoupling of the axial engagement of the sliding sleeve from the actuating movement of the drive of the actuator system, the spring elements are attached either to movement elements of the actuator system in front of the shift fork or to the clutch body of the first movable component of the claw clutch.

Furthermore, the detection of reliable engagement of the tooth systems of the sliding sleeve and of the clutch body can also be further simplified or reduced at detection points, with just one sensor being required for detecting the reliable engagement of the tooth system of the sliding sleeve on elements of the actuator system which are situated outside the clutch. For this purpose, the spring element has a limited maximum loading travel, which is smaller than it would be in the case of a travel of the sliding sleeve against the clutch body when the tooth-on-tooth position is released by defined reliable (i.e. complete) engagement of the second tooth system of the sliding sleeve into the first tooth system of the clutch body. It is thereby possible to eliminate a sensor, which is usually situated on the clutch body by virtue of the fact that, in the case of the release of a tooth-on-tooth position, the spring element can carry out the engagement of the sliding sleeve only partially owing to its limited maximum loading travel.

One aspect of the invention provides new simplified possibilities for operating a claw clutch for an electric drive train of a motor vehicle which permit reliable positive connection of the claw clutch by decoupling the actuator movement and the movement of the sliding sleeve during the release of tooth-on-tooth positions of the clutch body and sliding sleeve and, at the same time, reduce the number of movable elements on the movable component which carries the sliding sleeve. Furthermore, reliable detection of the shift positions is made possible without a further sensor on the same side as the clutch body.

BRIEF DESCRIPTION OF THE DRAWINGS

The invention is explained in greater detail below with reference to an exemplary embodiment and drawings. In the drawings.

DETAILED DESCRIPTION OF THE PRESENTLY PREFERRED EMBODIMENTS

Figure 1A:
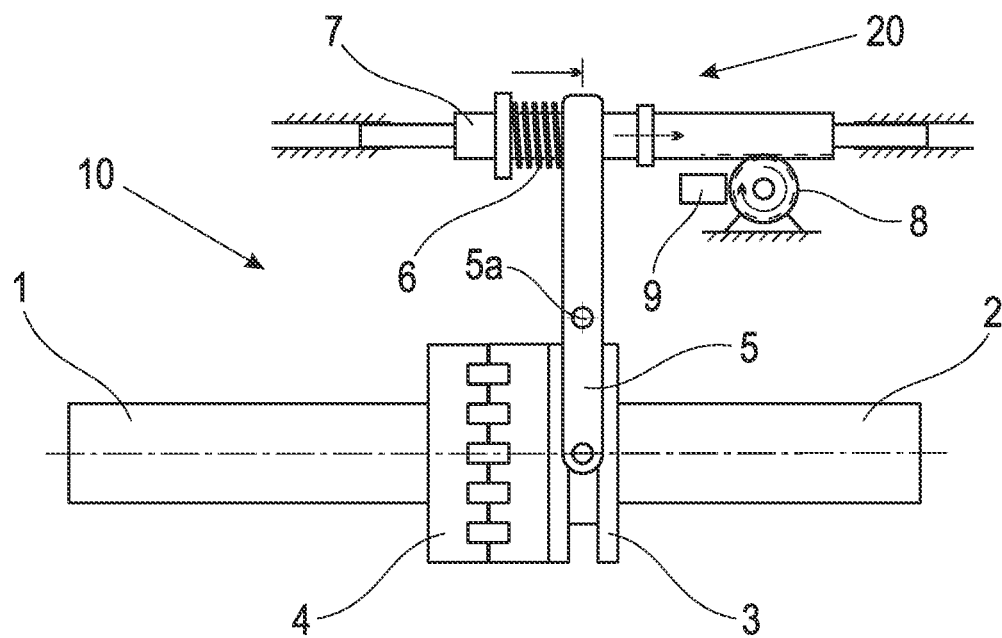
FIG. 1A: is a schematic illustration of a claw clutch in which the connection of the opposing tooth systems is prevented by a tooth-on-tooth position and a spring element situated in front of the shift fork is loaded by the drive of the actuator system in order to decouple the sliding sleeve movement.
Figure 1B:
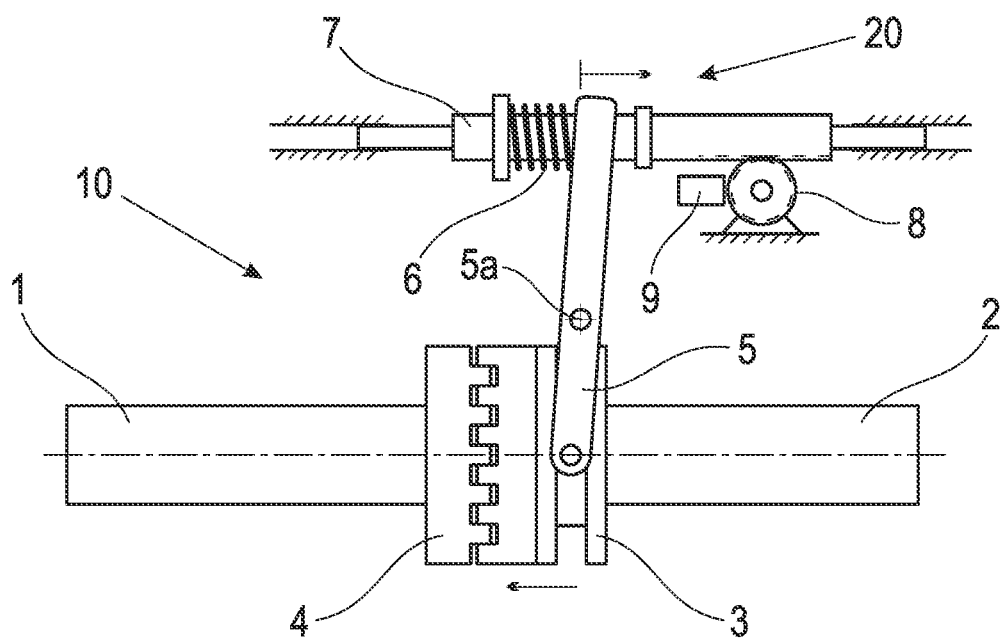
FIG. 1B: is a schematic illustration of the claw clutch of FIG. 1A, in which the tooth-on-tooth position is released and the relaxing spring element ensures the engagement of the tooth systems of the sliding sleeve in the clutch body.

FIG. 1A, 1B shows a schematic illustration of a claw clutch 10 for connecting the drive train to an electric drive, which is moved from an open state by an actuator system 20 into a closed state, wherein the actuator system 20 is being prevented from reaching the coupled state as a result of a tooth-on-tooth position of the claw clutch 10. In order primarily to minimize the noise of the shifting process, the first rotatable component 1 with a clutch body 4 fixed for conjoint rotation is contacted by means of a sliding sleeve 3, which is fixed for conjoint rotation but axially movable on the second rotatable component 2. For the positive connection of the second component 2 to the first component 1, the sliding sleeve 3 is provided with a tooth system 3a, which is to be brought into mutual engagement with a complementary tooth system 4a of the clutch body 4.

In a tooth-on-tooth position of the two tooth systems 3a and 4a, which often occurs, the force effect of the actuator system 20, which is introduced onto the sliding sleeve 3 via a shift fork 5, is partially decoupled from the axial claw movement on account of a spring element 6, wherein the spring element 6 converts the drive movement which can no longer be carried out into a spring load.

For monitoring and/or controlling the executed movement of the drive 8 of the actuator system 20, there is usually a sensor 9, which detects either the angle of rotation of the drive 8 or the travel of the (in this case: linearly) moved actuator element 7, preferably incrementally.

The loading of the spring element 6 up to a final shutdown of the drive 8 when a predetermined actuating position (load-dependent or position-dependent) of the drive 8 is reached ensures that the pressure force on the tooth systems of the sliding sleeve 3 and the clutch body 4 is not increased above a predetermined value. This state is shown in FIG. 1A, in which a linearly moved actuator element 7, shown here as an example, has brought about the loading of the spring element 6 against the shift fork 5.

For this purpose, FIG. 1B shows a subsequent state when the tooth-on-tooth position is released by applying a slight torque to one of the rotatable components 1 or 2. In this case, the energy stored in the spring element 6 causes the shift fork 5 to move forward, the shift fork 5, which operates here as a lever via a pivot point 5a, drives the sliding sleeve 3 further and causes its tooth system 3a to engage in the tooth system 4a of the clutch body 4.

In order to carry out the shifting movements or for positively connecting the rotatable components 1 and 2 of the claw clutch 10, the requisite actuation for the axial movement of the sliding sleeve 3 can be carried out in a very wide variety of ways. It can take place mechanically, electrically, hydraulically or the like. Irrespective of the type of actuation, the actuator system 20 can be coupled in a very wide variety of ways via the shift fork 5 in order to actuate the sliding sleeve 3 linearly in the axial direction, as can be seen only schematically in the following FIGS. 2 to 8 as an illustrative, non-exhaustive selection of design possibilities.

Figure 2:
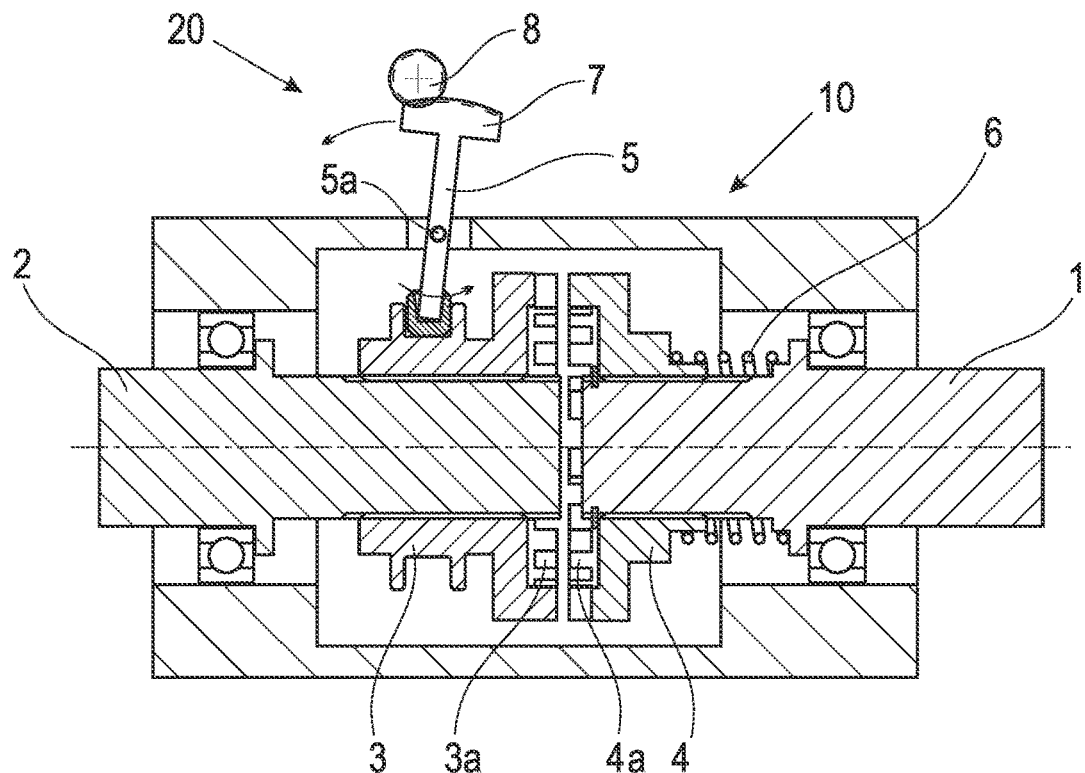
FIG. 2: is the claw clutch with direct drive of the shift fork of the sliding sleeve and a clutch body mounted in an axially spring-loaded manner on the first rotatable component.

FIG. 2 shows a further embodiment of the claw clutch 10, which has a completely different interaction of the actuator system 20 for the movement of the sliding sleeve 3 and the axial decoupling of the sliding movement of the two tooth system systems 3a and 4a from one another when a tooth-on-tooth position is to be cushioned.

In contrast to the variant according to FIGS. 1A and 1B, in which the spring element 6 is arranged outside the movement space of the sliding sleeve 3 in the actuator system 20, in the embodiment according to FIG. 2, the yielding movement in the case of a tooth-on-tooth position of the claw clutch 10 is achieved by virtue of the fact that the otherwise absolutely fixed clutch body 4 has a slight axial mobility on the first movable component 1. This axial mobility acts exclusively passively and is designed, by means of a spring element 6 in the form of a barrel spring 6a opposing the pressure exerted by the sliding sleeve 3 in the tooth-on-tooth position, in such a way that the driving movement of the actuator system 20, which can no longer be carried out, is converted into a compressive stress of the barrel spring 6a. The barrel spring 6a can also be replaced by one or more diaphragm springs 6b on account of the short spring travels required.

With this type of axial decoupling of the movement of the drive 8 from the engagement movement of the tooth systems 3a and 4a, the actuator system 20 can be embodied in a particularly simple and direct way in that a shift fork 5 which can be pivoted as a lever about a pivot point 5a on the one hand engages on the sliding sleeve 3 and, on the other hand, meshes with a pinion of the drive 8 along a toothed ring sector 7f matched to the pivoting range of the shift fork 5.

Figure 3:
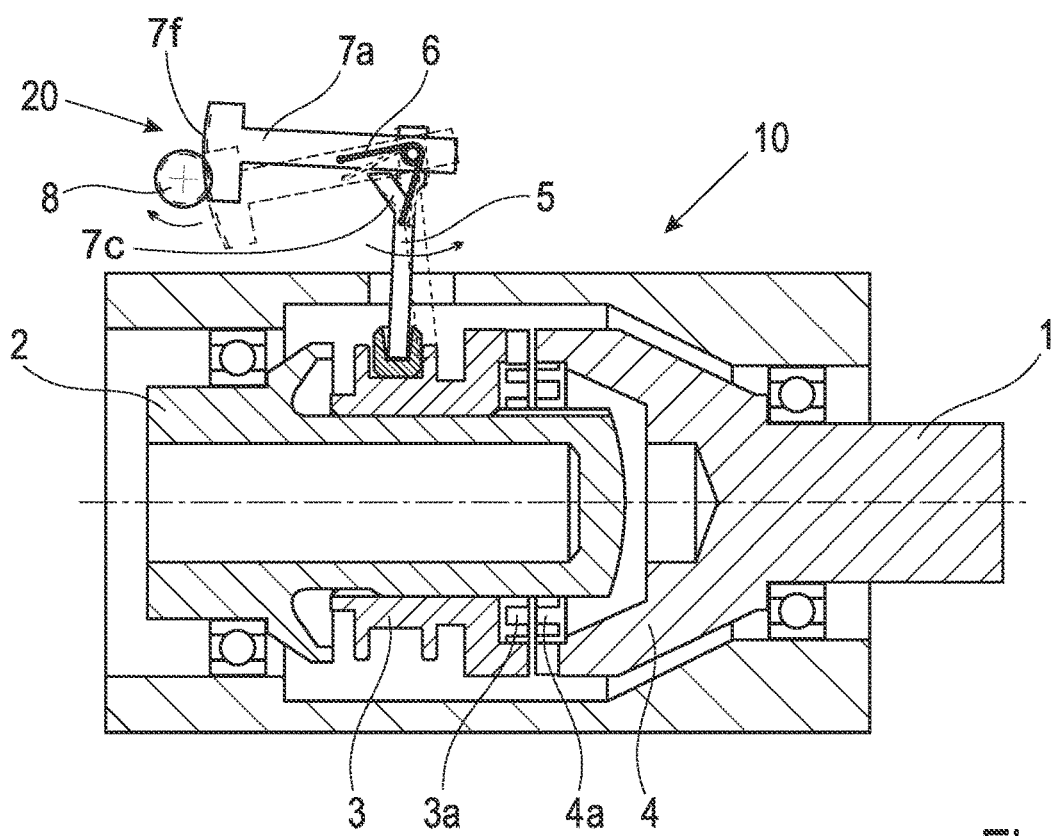
FIG. 3: is the claw clutch with a spring rocker on the shift fork of the sliding sleeve.

A further variant of the decoupling of the movements of the sliding sleeve 3 and the drive 8 of actuator system 20 is illustrated schematically in FIG. 3. Here, the spring element 6 is again arranged in the actuator system 20, wherein the spring element 6 is designed as a leg spring 6a (designated only in FIG. 4 and FIG. 5) and the shift fork 5 is thus driven by a spring rocker in order to move the sliding sleeve 3 in an axially decoupled manner. As in FIG. 2, the drive 8 of the actuator system 20 can engage with a toothed ring sector 7f directly on the spring rocker 7a. In addition, the spring rocker 7a has a stop 7c opposite the shift fork 5 for limiting the spring travel during the loading and relaxation of the leg spring 6a to ensure a limited engagement movement of the sliding sleeve 3 into the clutch body 4 when the tooth-on-tooth position is released. Single-sensor detection of the reliable engagement state of the claw clutch 10 for this purpose is described in more detail below with reference to FIGS. 5, 7 and 8.

Respective sequences of the shifting process for coupling in a plurality of steps using a plurality of actuator elements 7 are shown for different embodiments of the actuation of the sliding sleeve movement in the following drawings.

Figure 4A:
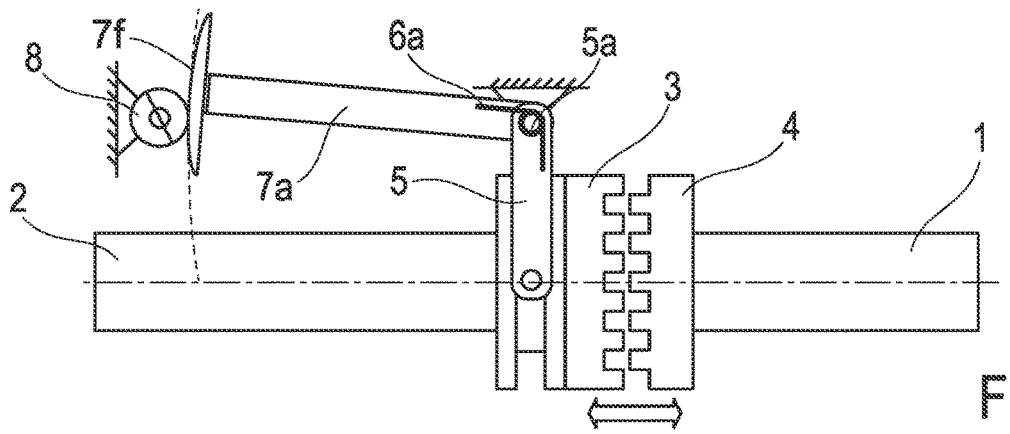
FIG. 4A: is the claw clutch according to FIG. 3 in the open state.

FIGS. 4A to 4D schematically illustrate an embodiment of the actuation in which the drive 8 drives a spring rocker 7a via a toothed ring sector 7f, wherein the connection to the spring fork 5 is embodied by a leg spring 6a as a spring element 6. FIG. 4A shows the state of the disengaged claw clutch 10 (designated only in FIGS. 1 to 3).

Figure 4B:
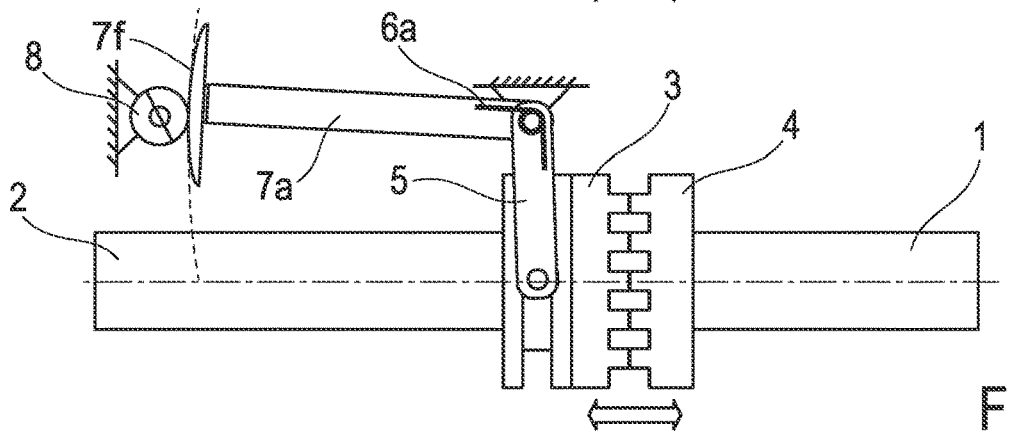
FIG. 4B: is the claw clutch of FIG. 4A after the start of the movement of the actuator system when a tooth-on-tooth position occurs.

In FIG. 4b, the drive 8 has started to move and the shift fork 5 has been pivoted about the pivot point by means of the spring rocker 7a. As a result, the shift fork 5 pushes the sliding sleeve 3 in the direction of the claw body 4 and reaches an axial position which leads to a tooth-on-tooth position.

Figure 4C:
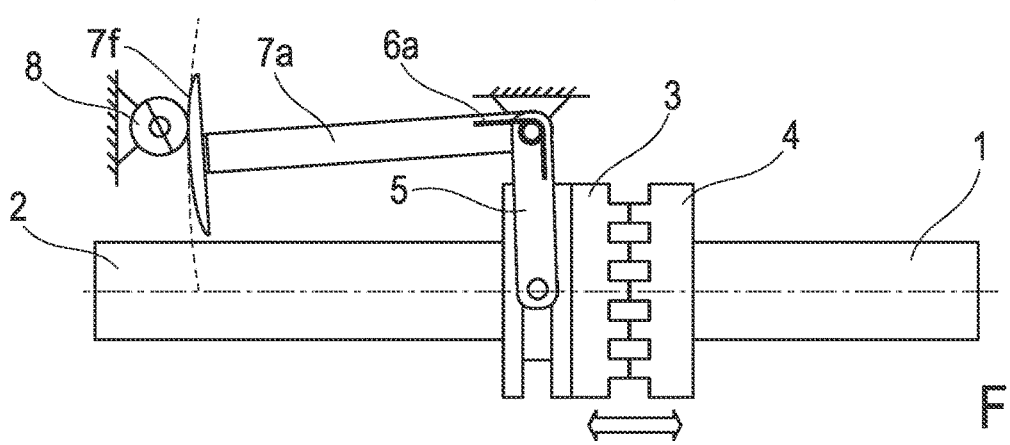
FIG. 4C: is claw clutch in continuation of the actuator movement according to FIG. 4B, in which a leg spring is loaded rotationally.

When the tooth-on-tooth position is reached, the spring rocker 7a has been moved further by the drive 8, as can be seen in FIG. 4C, although the shift fork 5 can no longer be moved with it, leading to the loading of the leg spring 6 until the drive 8 stops because either it switches off in a load-dependent manner or has reached a predefined position.

Figure 4D:
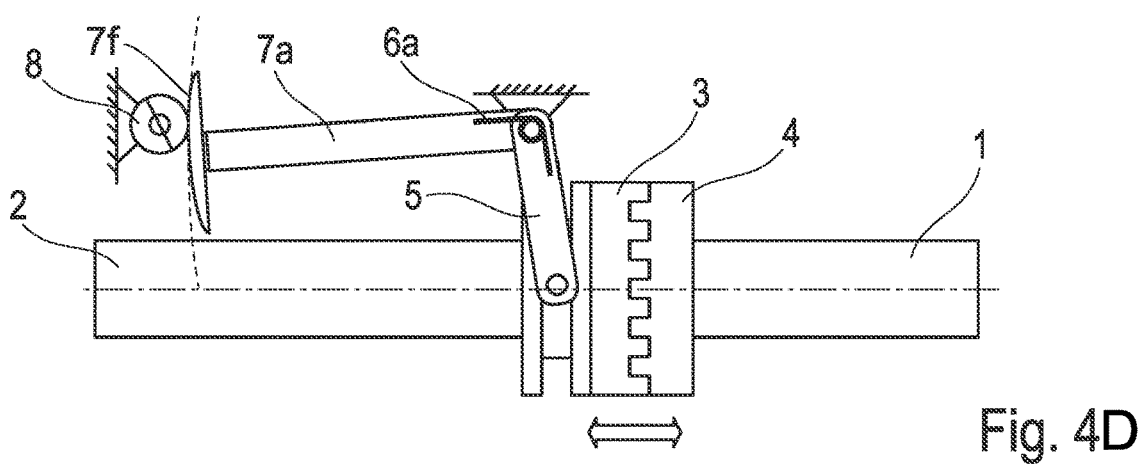
FIG. 4D: is the claw clutch in continuation of FIG. 4C, when the tooth-on-tooth position is released.

FIG. 4D shows a state after the tooth-on-tooth position has been released by rotation of one of the two rotatable components 1 or 2 and the sliding sleeve 3 has been able to engage with its tooth system 3a in the tooth system 4a of the clutch body 4. In this case, the movement of engagement takes place while the drive 8 is stationary because the leg spring 6a was able to relax.

FIGS. 5A to 5D show a modified embodiment of the actuator system 20 of FIG. 4, in which the special feature is that the reliable engagement of the claw clutch 10 is to be detected by just one sensor 9, without a further distance sensor being present on the sliding sleeve 3 or clutch body 4 for this purpose.

Figure 5A:
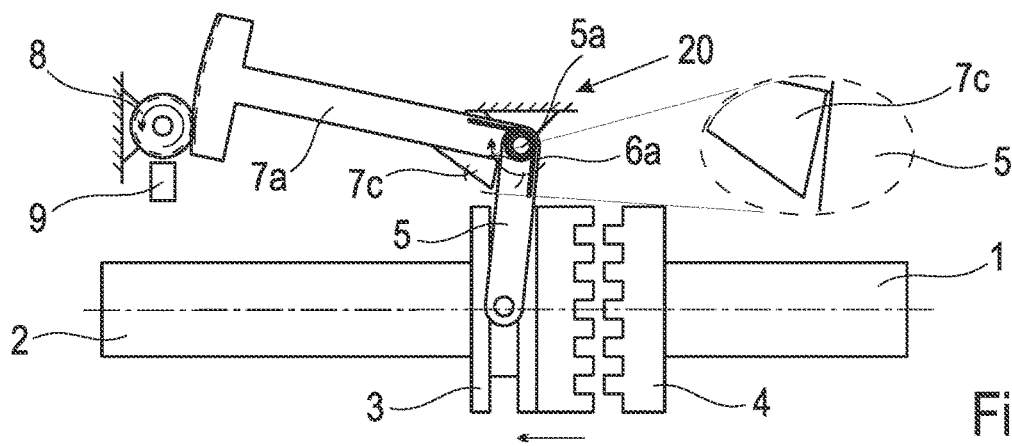
FIG. 5A: is a schematic illustration of a claw clutch modified as compared with FIG. 3 and FIGS. 4A-D with a limited loading travel of the leg spring with the claw clutch open.
Figure 5B:
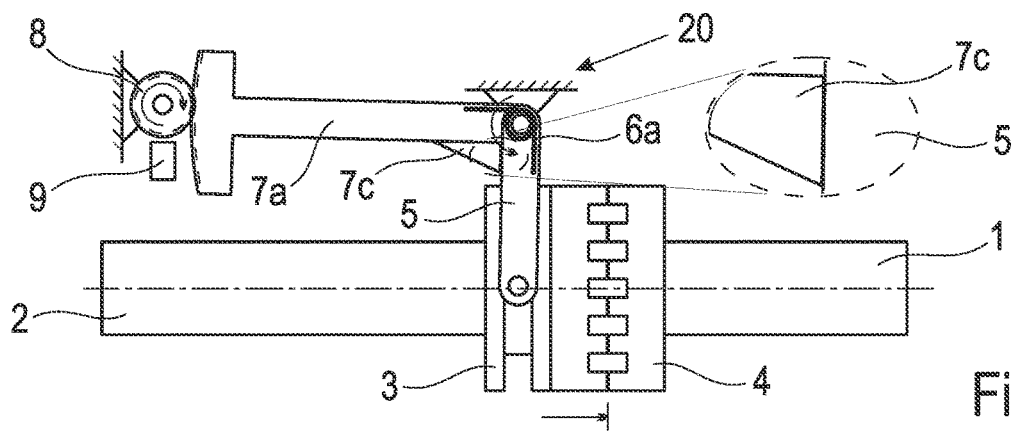
FIG. 5B: is a schematic illustration of the claw clutch of FIG. 5B during the occurrence of a tooth-on-tooth position with continued actuator movement, by which the leg spring is loaded rotationally as far as a stop.

FIG. 5A shows the disengaged state of the claw clutch 10 as in FIG. 4A, but the spring rocker 7a additionally has a stop 7c. An enlarged detail view of the stop 7c— in this example a wedge attached to the spring rocker 7a— shows that there is a wedge-shaped gap with respect to the shift fork 5, which gap limits the loading travel of the leg spring 6a if—as illustrated in FIG. 5B—a tooth-on-tooth position occurs during the closing movement of the claw clutch 10.

At the start of the movement of the drive 8 of the actuator system 20 according to FIG. 5A, the spring rocker 7a drives the sliding sleeve 3 axially in the direction of the clutch body 4 of the first rotatable component 1 via the leg spring 6a and the shift fork 5. When the tooth-on-tooth position (FIG. 5B) occurs, the leg spring 6a is loaded via the spring rocker 7a, as the driving movement of the drive 8 continues, until the stop 7c has closed the wedge-shaped gap with respect to the shift fork 5. As a result of a load-dependent shutdown, the drive movement of the drive 8 stops and remains in the position reached.

Figure 5C:
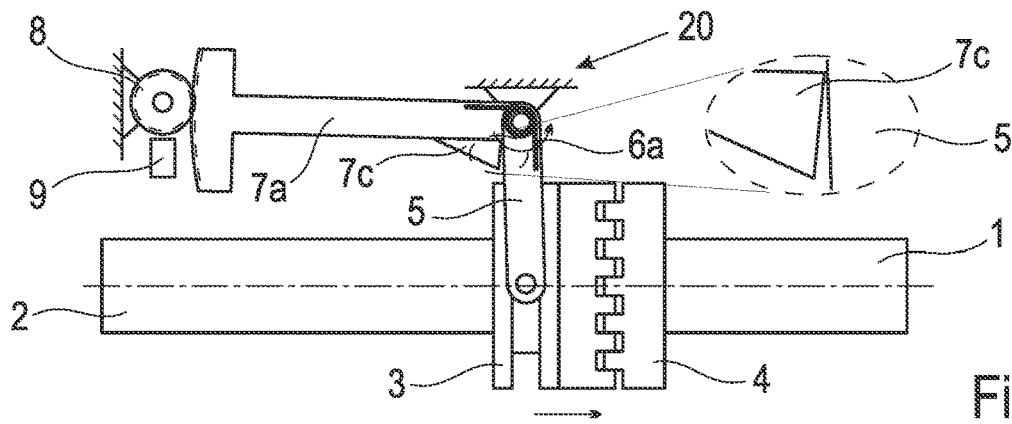
FIG. 5C: is a schematic illustration of the claw clutch in continuation of FIG. 5B, with the actuator movement stopped and the tooth-on-tooth position released until the leg spring is relaxed.

If the tooth-on-tooth position is then released in a known manner, the spring load of the leg spring 6a can initiate the axial movement of the sliding sleeve 3, as shown in FIG. 5C. Owing to the limited loading travel of the leg spring 6a, however, the engagement of the tooth system 3a of the sliding sleeve 3 into the tooth system 4a of the clutch body 4 is not carried out completely, with the result that the load-induced shutdown of the drive 8 is cancelled and the drive 8 continues its movement of the spring rocker 7a as far as the end position of the engagement of the tooth systems 3a and 4a.

Figure 5D:
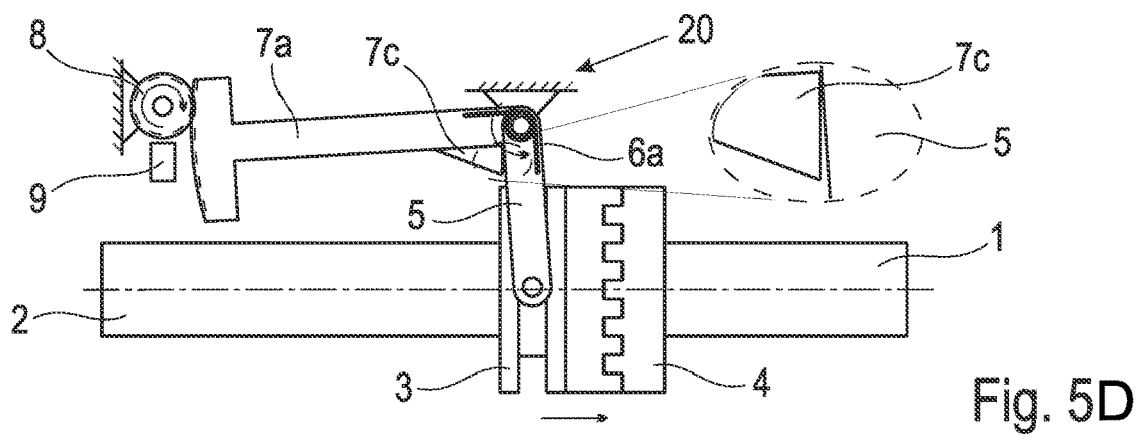
FIG. 5D: is a schematic illustration of the claw clutch in continuation of FIG. 5C with continued actuator movement up to a defined engaged state of the sliding sleeve.

This continuation of the drive movement of the drive 8—as shown in FIG. 5D—is detected by the sensor 9, which in this example is to be provided as an incremental rotary encoder on the drive pinion of the drive 8, in that the drive 8 can only continue its movement as far as the predetermined end position after the tooth-on-tooth position (according to FIG. 5C) has been released. Thus, if the sensor 9 detects that the predetermined end position has been reached, the coupled state of the claw clutch 10 has occurred with certainty and no further sensor is required on the sliding sleeve 3 or clutch body 4 in order to detect the engaged contact state.

A further exemplary embodiment of the actuator system 20 for actuating the claw clutch 10 is shown in FIGS. 6A to 6D as a sequence of steps in the course of closing.

Figure 6A:
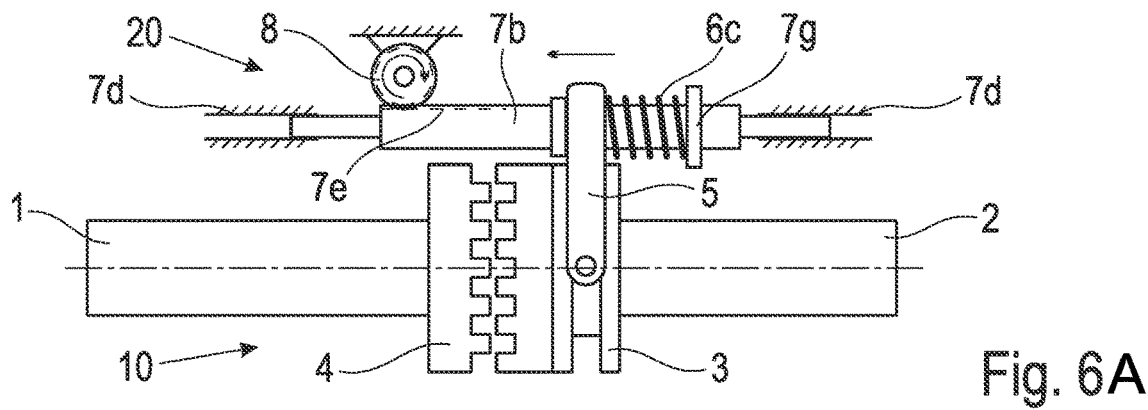
FIG. 6A: is a schematic illustration of a claw clutch modified as compared with FIGS. 1A, B with a shift fork guided on a linear guide and linearly movable by a diaphragm spring.

First, FIG. 6A shows the open state. In this variant embodiment, the sliding sleeve 3 is moved axially by a shift fork 5 which projects laterally on a linear guide 7b arranged parallel to the axis of the two rotatable components 1 and 2 and can actuate the sliding sleeve 3 axially with the movement of the linear guide. In FIG. 6A, there is a rack-and-pinion mechanism 7e, in which the drive 8 engages, for the linear guide 7b. However, the rack-and-pinion mechanism 7e could also be replaced by a screw drive.

Figure 6B:
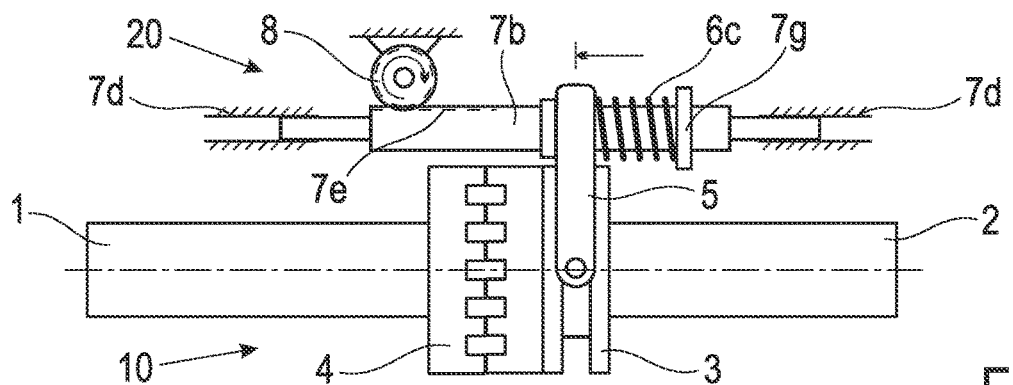
FIG. 6B: is a schematic illustration of the claw clutch of FIG. 6A during the occurrence of a tooth-on-tooth position with continued actuator movement.
Figure 6C:
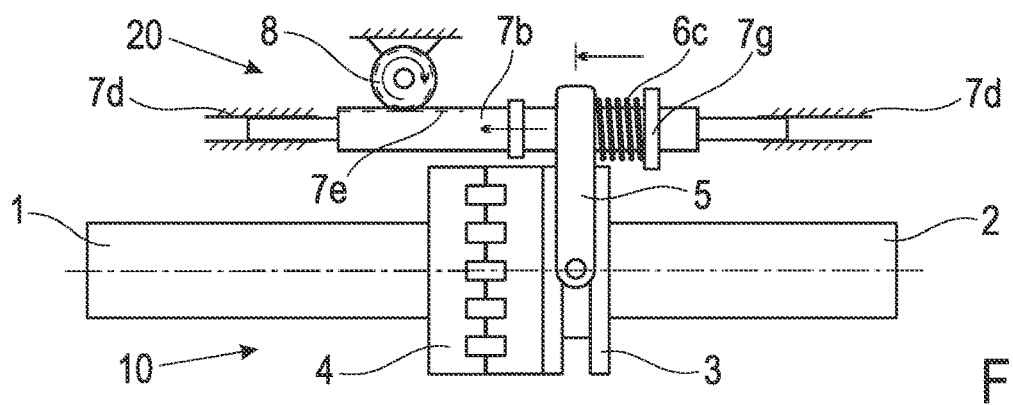
FIG. 6C: is a schematic illustration of the claw clutch of FIG. 5B with continued actuator movement, by which the diaphragm spring is linearly compressed as far as a stop.

In FIG. 6B, the drive 8 has moved the linear guide 7b linearly in its sliding bearings 7d via the rack-and-pinion gear 7e and has thereby moved the sliding sleeve 3 into a tooth-on-tooth position via the entrained shift fork 5, which in this example projects orthogonally. With the occurrence of this state, the linear guide 7b is moved further linearly with continued operation of the drive 8, and a diaphragm spring 6c is compressed between an annular flange 7g and the blocked shift fork 5.

Figure 6D:
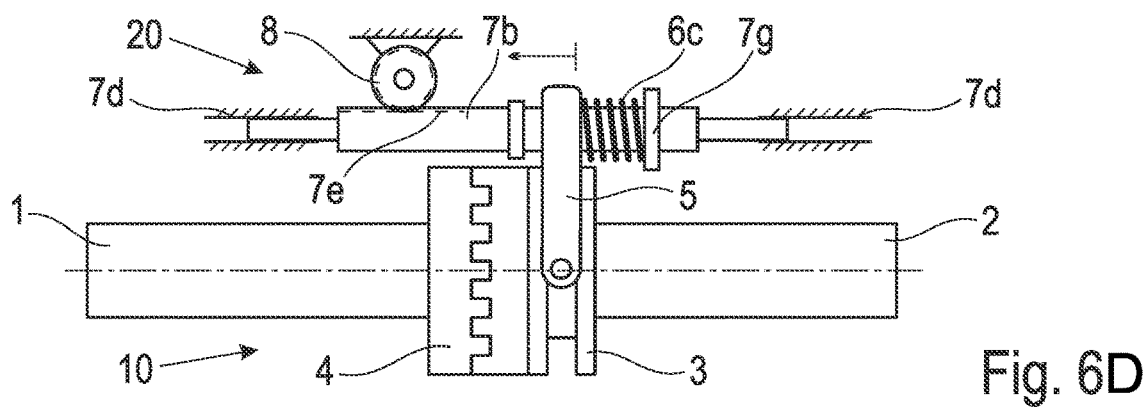
FIG. 6D: shows a schematic illustration of the claw clutch with the actuator movement stopped and the tooth-on-tooth position released, in which the sliding sleeve is moved as far as a defined engaged state by relaxation of the diaphragm spring.

After the release of the tooth-on-tooth position according to FIG. 6D, the tooth system 3a of the sliding sleeve 3 is then engaged into the tooth system 4a of the clutch body 4 with the aid of this stored spring stress of the diaphragm spring 6c.

FIGS. 7A to 7D show the mode of operation of a modified variant of the actuator system 20 of FIGS. 6A-D.

Figure 7A:
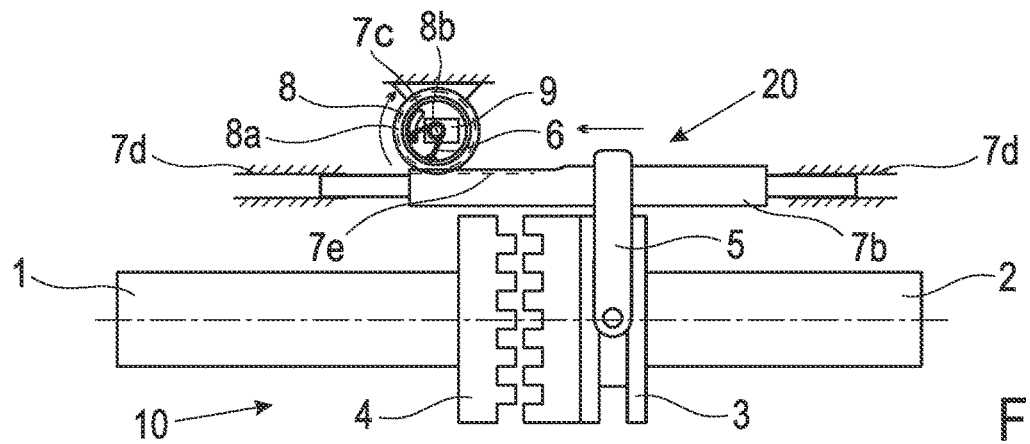
FIG. 7A: is a schematic illustration of a claw clutch modified as compared with FIGS. 6A-D with a limited loading travel of a torsion spring on the drive of the actuator system.

In contrast to this, the linear guide 7b—as illustrated schematically in FIGS. 7a-d—is equipped with a rigidly fastened laterally projecting shift fork 5. In this example, the spring element 6 is a torsion spring, which can be loaded on the drive shaft 8b relative to the pinion 8a on account of a limited slip of the pinion 8a. As in the previous example, the pinion 8a engages in a rack-and-pinion mechanism 7e and, with activation of the drive 8, initiates the closing of the claw clutch 10, as shown in FIG. 7A.

Figure 7B:
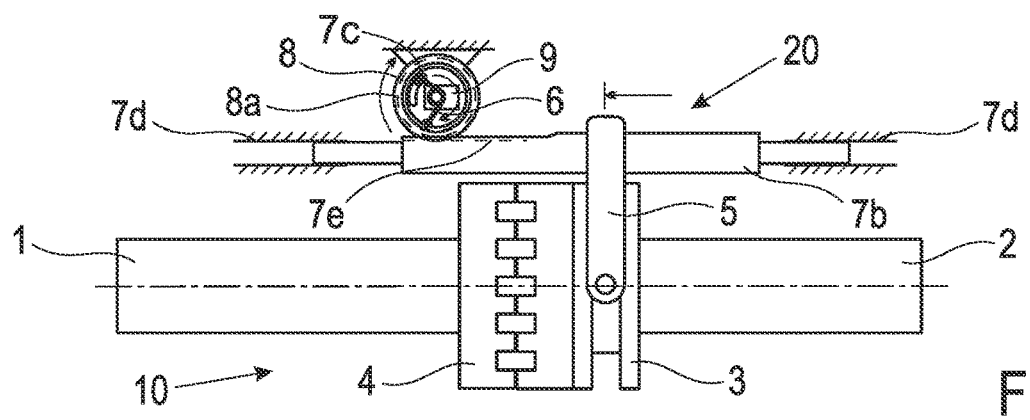
FIG. 7B: is a schematic illustration of the claw clutch of FIG. 7A during the occurrence of a tooth-on-tooth position with continued actuator movement, by which the torsion spring is loaded rotationally as far as a stop.

In this case, the entire linear guide 7b is blocked with the tooth-on-tooth position according to FIG. 7B, and the drive 8, which is still in operation, leads to the loading of the spring element 6 until the slip of the pinion 8a limits the loading state by the built-in stop 7c in the form of a tangential groove, and the drive 8 is stopped by a load overshoot.

Figure 7C:
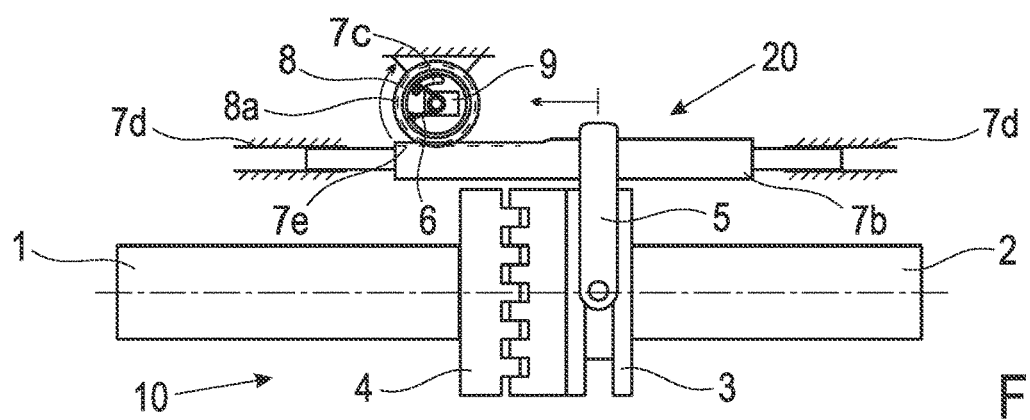
FIG. 7C: is a schematic illustration of the claw clutch in continuation of FIG. 7B, with the actuator movement stopped and the tooth-on-tooth position released until the torsion spring is relaxed.
Figure 7D:
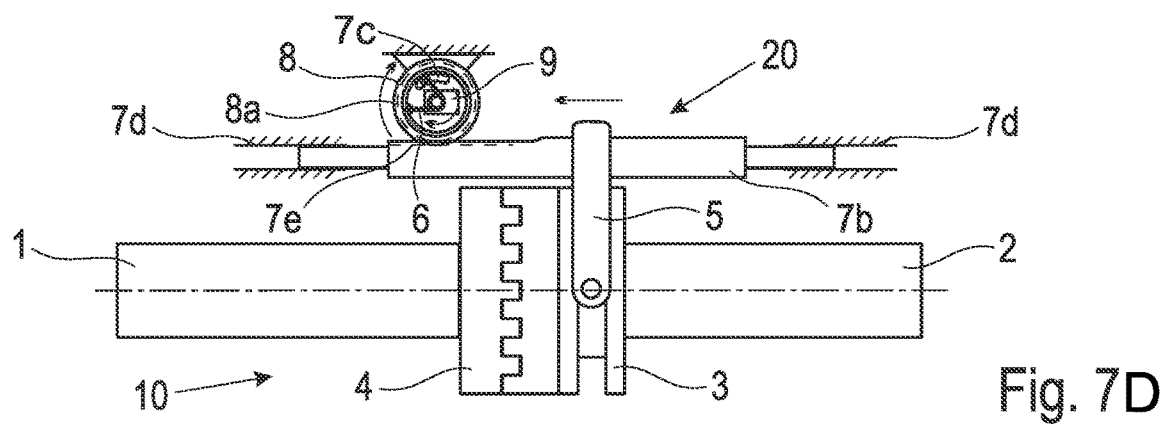
FIG. 7D: is a schematic illustration of the claw clutch in continuation of FIG. 7C with continued actuator movement up to a defined engaged state of the sliding sleeve.

Once the tooth-on-tooth position according to FIG. 7c has been released, the spring element 6 relaxes by the slip of the pinion 8a, which is limited by the stop 7c, and drives the linear guide 7b without the end position of the engagement of the tooth systems 3a and 4a being reached.

The disappearance of the load overshoot results in the drive 8 being activated again and executing the movement of the linear guide 7b with the rigidly connected shift fork 5 and thus of the sliding sleeve 3 into the predetermined end position. A sensor 9, which is mounted on the drive shaft 8b of the drive 8 in this design variant of the actuator system 20 and which is designed here as an incremental rotary encoder, thus detects the reaching of the predetermined end position of the drive 8. Since the predetermined end position of the drive 8 could not be reached in the tooth-on-tooth position, this counts as a reliable closed state of the claw clutch 10 without the need for confirmation by a further sensor.

Figure 8A:
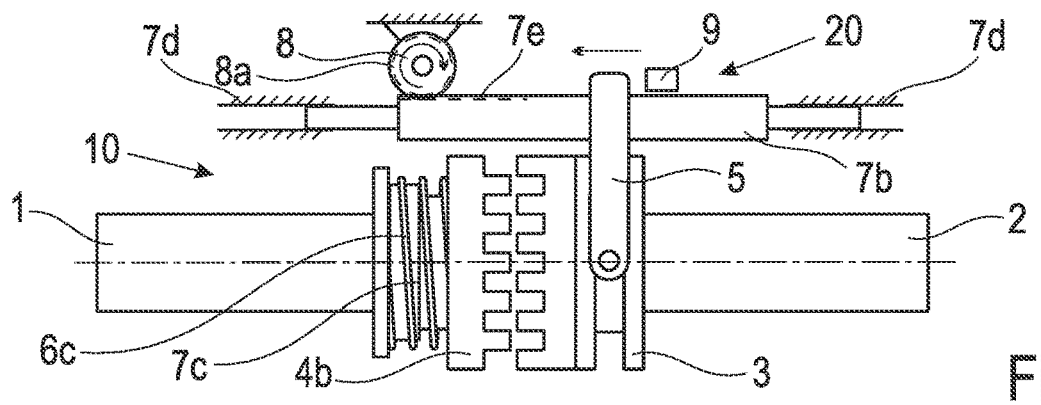
FIG. 8A: is a schematic illustration of a claw clutch modified as compared with FIG. 2 and FIGS. 6A-D with a limited loading travel of a diaphragm spring between an axially movable clutch body and the first rotatable component.

A further embodiment of the claw clutch 10 is illustrated in FIGS. 8A to 8D. As in the previous example according to FIGS. 7A-D, a linear guide 7b with a rigidly guided shift fork 5 is again linearly movable in sliding bearings 7d, in that the drive 8 engages with its pinion 8a in a rack-and-pinion mechanism 7e. In this case, a sensor 9 for detecting the reliable engagement of the tooth systems 3a and 4a is arranged on the linear guide 7b and is designed as a linear displacement sensor. In this connection, FIG. 8A shows the open state of the claw clutch 10, in which the drive 8 has just been activated.

Figure 8B:
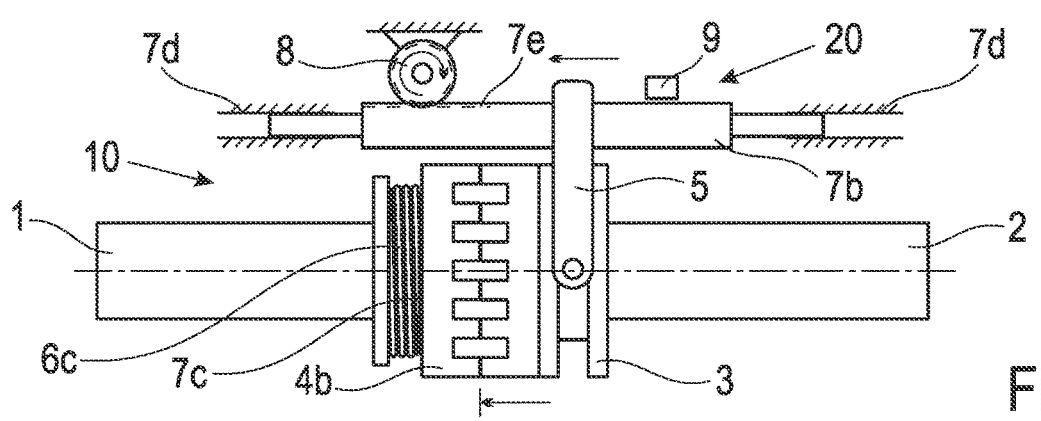
FIG. 8B: is a schematic illustration of the claw clutch of FIG. 8A during the occurrence of a tooth-on-tooth position with continued actuating movement of the actuator and sliding sleeve, by which the diaphragm spring is loaded in translation to a limited extent as far as a stop.

In FIG. 8B, a tooth-on-tooth position has again been reached. Referring to FIG. 2, in this example the clutch body 4 is mounted on the first rotatable component 1 in a resiliently axially movable manner, as a result of which, with continued movement of the drive 8, of the linear guide 7b with the rigidly fastened shift fork 5, the sliding sleeve 3 loads the spring element 6 in accordance with this direct drive transmission.

Figure 8C:
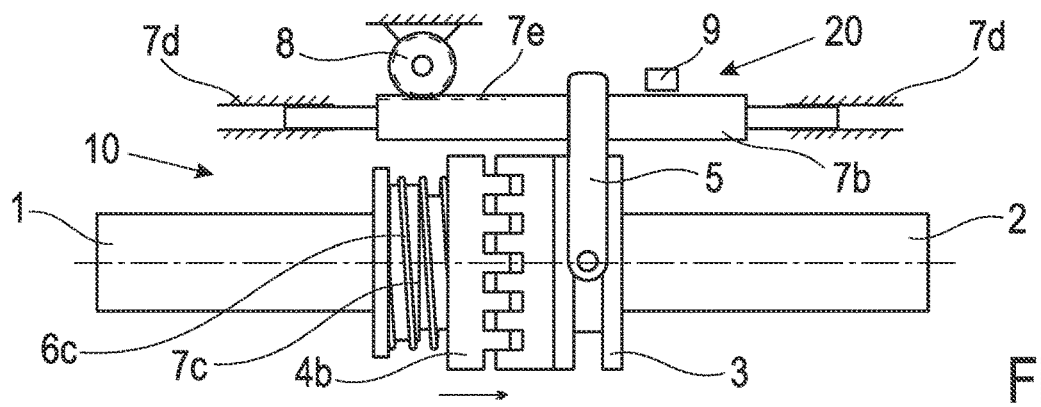
FIG. 8C: is a schematic illustration of the claw clutch in continuation of FIG. 8B, with the actuator movement stopped and the tooth-on-tooth position released, in which the clutch body is moved back against the sliding sleeve until the diaphragm spring is relaxed.
Figure 8D:
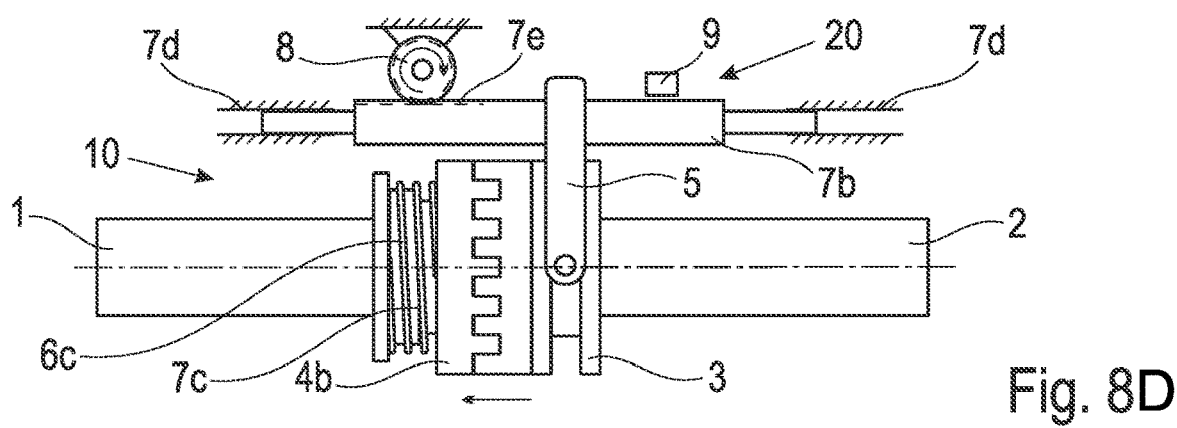
FIG. 8D: is a schematic illustration of the claw clutch in continuation of FIG. 8C with continued actuator movement up to a defined engaged state of the sliding sleeve.

In contrast to FIG. 2, the loading travel of the spring element 6 is limited by a stop 7c (visible only in FIGS. 8A and 8D), and therefore, when the tooth-on-tooth position is released according to FIG. 8C, tooth system 4a engages only partially into the tooth system 3a of the sliding sleeve 3.

The remaining free movement of the engagement of the tooth systems 3a and 4a as far as the predetermined end position is effected by renewed activation of the drive 8, wherein the sensor 9 mounted on the linear guide 7b detects the reaching of the end position and thus detects the reliable closed connection of the claw clutch 10 without further sensors.

It should be noted that the above explanations represent only selected concrete examples of the invention and any further combination of actuator elements 7 with the different variants of the actuation of the claw clutch 10 and with or without a sensor for the detection of the reliable connection of the clutch tooth systems 3a and 4a likewise falls within the teaching according to the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method to actuate a claw clutch to positively connecting a first rotatable component to a second rotatable component, wherein a clutch body, which is arranged on the first rotatable component for conjoint rotation therewith, has a first tooth system, and a sliding sleeve, which is arranged on the second rotatable component in a manner which allows conjoint rotation and axial movement, has a second tooth system, comprising:
   a) moving the sliding sleeve of the second rotatable component axially for positive connection to the clutch body of the first rotatable component by a shift fork by an actuator system, wherein the shift fork pivots about a pivot point in response to a linear movement by the actuator;
   b) loading a spring element outside the second rotatable component equipped with the sliding sleeve by the actuator system via the shift fork when a tooth-on-tooth position of the sliding sleeve relative to the clutch body of the first rotatable component occurs;
   c) loading the spring element up to a loading travel of the spring element, which is sufficient to allow reliable engagement of the second tooth system of the sliding sleeve into the first tooth system of the clutch body after the tooth-on-tooth position has been released; and
   d) relaxation of the spring element to actuate the sliding sleeve when the tooth-on-tooth position has been released by relative rotation between the first and second movable components of the claw clutch.

2. The method according to claim 1, wherein the spring element is loaded rotationally on an actuator element that drives the shift fork.

3. The method according to claim 2, wherein the spring element is loaded rotationally between a drive and a drive shaft of the actuator system.

4. The method according to claim 2, wherein the spring element is loaded rotationally on a shift fork which is operated in a pivoting manner as a shift rocker so as to operate the sliding sleeve.

5. The method according to claim 1, wherein the spring element is loaded linearly on an actuator element which drives the shift fork.

6. The method according to claim 5, wherein the axial movement of the sliding sleeve is effected by the actuator element with a laterally rigidly connected shift fork by parallel movement of the actuator element.

7. The method according to claim 1, wherein the spring element is loaded axially against the first rotatable component on the clutch body opposite the sliding sleeve when the tooth-on-tooth position occurs during movement of the sliding sleeve.

8. The method according to claim 1, wherein
   in c), the spring element is loaded up to a maximum loading travel, which is smaller than a travel of the sliding sleeve against the clutch body when the tooth-on-tooth position is released by engagement of the second tooth system of the sliding sleeve into the first tooth system of the clutch body such that full engagement occurs in a fully engaged position; and
   in e), a shift position for reliable engagement of the second tooth system of the sliding sleeve into the first tooth system of the clutch body is detected by measuring the position of a selected actuator element of the actuator system, which is situated in front of the spring element in a direction of the sliding sleeve for engagement, wherein the position for reliable engagement of the tooth system is identified when a predetermined final end position of the selected actuator element can only be reached when a previous tooth-on-tooth position has been released and engagement by the maximum loading travel of the spring element, when loaded, has been carried out.

9. The method according to claim 8, wherein the shift position of the claw clutch is determined by angular measurement on a rotationally operated actuator element.

10. The method according to claim 9, wherein the shift position is determined by angular measurement on a driven arm of the pivotable shift fork, which is equipped with a spring rocker.

11. The method according to claim 9, wherein the shift position of the claw clutch is determined by angular measurement on a drive of the actuator system.

12. The method according to claim 9, wherein the shift position is determined by an incremental rotary encoder.

13. The method according to claim 8, wherein the shift position of the claw clutch is determined by length measurement on a linearly movable actuator element, which moves the sliding sleeve axially via the shift fork.

14. The method according to claim 13, wherein the shift position of the claw clutch is determined with an incremental displacement sensor on the linearly operated actuator element.

15. A claw clutch arrangement for positively connecting a first rotatable component to a second rotatable component, comprising:
   a clutch body is arranged on the first rotatable component for conjoint rotation therewith and has a first tooth system;

a sliding sleeve, which is arranged on the second rotatable component in a manner which allows conjoint rotation and axial movement, and has a second tooth system; and a shift fork configured to pivot about a pivot point and axially move the sliding sleeve for positive connection to the clutch body of the first rotatable component by an actuator system to load a spring element by the actuator system in case of a tooth-on-tooth position;

wherein the spring element to be loaded is arranged outside the second rotatable component equipped with the sliding sleeve.

16. The claw clutch according to claim 15, wherein the clutch body is axially movable on the first rotatable component and is equipped with the spring element.

17. The claw clutch arrangement according to claim 15, wherein the actuator system has the spring element on an actuator element mounted in front of the shift fork in a direction for engagement of the sliding sleeve.

18. The claw clutch arrangement according to claim 17, wherein the spring element is attached to a shift rocker as a leg spring at a pivot point of the shift fork.

19. The claw clutch arrangement according to claim 17, wherein the spring element is arranged as a barrel spring between an annular flange and the shift fork, on a linear guide on which the shift fork projects laterally and is axially movable.

20. The claw clutch arrangement according to claim 19, further comprising a rotational drive that moves the linear guide by a rack-and-pinion mechanism or a screw drive.

21. The claw clutch arrangement according to claim 17, wherein the spring element is attached as a torsion spring to a drive shaft of the actuator system and can be loaded over a defined loading travel by the rotational drive.

22. The claw clutch arrangement according to claim 15, wherein the spring element has a limited maximum loading travel, which is smaller than it would be in case of a travel of the sliding sleeve against the clutch body when the tooth-on-tooth position is released by defined reliable engagement of the second tooth system of the sliding sleeve into the first tooth system of the clutch bod such that no engagement occurs in the disengaged position and full engagement occurs in a fully engaged position.

23. The claw clutch arrangement according to claim 22, wherein the actuator system has a sensor to detect a shift position of the claw clutch, which is formed on a selected actuator element between a drive of the actuator system and the spring element in such a way that a further actuating movement of the selected actuator element can be detected by the sensor, which further actuating movement can only be carried out if, after the tooth-on-tooth position of the sliding sleeve and clutch body has been released, the limited maximum loading travel is reset by relaxation of the spring element and permits further engagement of the tooth systems of the sliding sleeve and the clutch body.

24. The claw clutch arrangement according to claim 23, wherein the sensor is attached as a rotary encoder to an actuator element which is moved in rotation or to the drive of the actuator system.

25. The claw clutch arrangement according to claim 23, wherein the sensor is attached as a displacement transducer to a linearly moved actuator element of the actuator system.

\* \* \* \* \*